United States Patent
Sekiguchi

(10) Patent No.: US 11,576,116 B2
(45) Date of Patent: Feb. 7, 2023

(54) INFORMATION PROCESSING APPARATUS AND CONTROL METHOD

(71) Applicant: CANON KABUSHIKI KAISHA, Tokyo (JP)

(72) Inventor: Shiho Sekiguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 16/685,996

(22) Filed: Nov. 15, 2019

(65) Prior Publication Data
US 2020/0169953 A1    May 28, 2020

(30) Foreign Application Priority Data
Nov. 22, 2018   (JP) .............................. JP2018-219685

(51) Int. Cl.
| | |
|---|---|
| H04W 4/00 | (2018.01) |
| H04W 48/20 | (2009.01) |
| H04W 88/08 | (2009.01) |
| H04W 12/08 | (2021.01) |
| H04N 1/00 | (2006.01) |

(52) U.S. Cl.
CPC .......... *H04W 48/20* (2013.01); *H04N 1/0097* (2013.01); *H04N 1/00973* (2013.01); *H04W 12/08* (2013.01); *H04W 88/08* (2013.01)

(58) Field of Classification Search
CPC .... H04W 48/16; H04W 48/08; H04W 12/068
USPC .................. 370/328, 329, 330, 331; 358/1.15
See application file for complete search history.

(56) References Cited

U.S. PATENT DOCUMENTS

| | | | |
|---|---|---|---|
| 10,237,448 B2 * | 3/2019 | Asakura | H04N 1/4426 |
| 10,397,774 B2 * | 8/2019 | Nakamura | H04W 24/02 |
| 11,160,121 B2 * | 10/2021 | Goto | H04W 76/18 |
| 2011/0191631 A1 * | 8/2011 | Suzuki | G06F 11/07 714/25 |
| 2013/0057905 A1 * | 3/2013 | Okazawa | H04W 24/02 358/1.15 |
| 2014/0079014 A1 * | 3/2014 | Lee | H04W 74/0808 370/329 |
| 2018/0048785 A1 * | 2/2018 | Shibata | H04W 76/14 |
| 2018/0234840 A1 * | 8/2018 | Nakamura | H04W 8/22 |
| 2019/0274050 A1 * | 9/2019 | Roche | H04L 41/0806 |

(Continued)

FOREIGN PATENT DOCUMENTS

| | | | | |
|---|---|---|---|---|
| AU | 2013273771 A1 * | 7/2014 | ......... | H04L 12/2807 |
| CA | 2822802 A1 * | 6/2012 | ........... | H04L 63/205 |

(Continued)

*Primary Examiner* — David Q Nguyen
(74) *Attorney, Agent, or Firm* — Canon U.S.A, , Inc. IP Division

(57) ABSTRACT

A control method for an information processing apparatus includes determining whether connection processing is executable by a predetermined access point, the connection processing being based on a predetermined standard for establishing a connection by the predetermined access point transmitting connection information for connecting to the predetermined access point, and executing notification processing for prompting a user to perform a predetermined operation on the predetermined access point, the predetermined operation for causing the predetermined access point to execute the connection processing, in a case where it is determined that the connection processing is executable by the predetermined access point.

20 Claims, 9 Drawing Sheets

(56) References Cited

U.S. PATENT DOCUMENTS

2020/0288517 A1\* 9/2020 Wang ................... H04W 48/16
2020/0389857 A1\* 12/2020 Lefevere ............. H04W 52/241

FOREIGN PATENT DOCUMENTS

| CN | 101562902 A | \* | 10/2009 | ......... G06Q 20/3278 |
|----|----|----|----|----|
| JP | 2011234205 A | | 11/2011 | |
| JP | 2014033282 A | | 2/2014 | |
| JP | 2017041771 A | | 2/2017 | |
| JP | 2018026698 A | | 2/2018 | |
| JP | 2018-129770 A | | 8/2018 | |

\* cited by examiner

INFORMATION PROCESSING APPARATUS AND CONTROL METHOD

BACKGROUND

Field

The present disclosure relates to an information processing apparatus and a control method therefor.

Description of the Related Art

Connection processing (simple connection processing) based on a standard for establishing a connection without receiving an input of connection information, such as a password, has been known and is typified by, for example, Wi-Fi Protected Setup™ (WPS).

Japanese Patent Application Laid-Open No. 2018-129770 discusses a printer connectable to an access point through a WPS push-button method or a WPS personal identification number (PIN) code method.

With popularization of an access point capable of executing the simple connection processing, there has been an increasing demand for improvement in convenience of establishing a connection through the simple connection processing.

SUMMARY OF THE INVENTION

The present disclosure is directed to improving the convenience of establishing a connection through the simple connection processing.

According to an aspect of the present disclosure, a control method for an information processing apparatus includes determining whether connection processing is executable by a predetermined access point, the connection processing being based on a predetermined standard for establishing a connection by the predetermined access point transmitting connection information for connecting to the predetermined access point, and executing notification processing for prompting a user to perform a predetermined operation on the predetermined access point, the predetermined operation for causing the predetermined access point to execute the connection processing, in a case where it is determined that the connection processing is executable by the predetermined access point.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described in detail below with reference to the drawings. The following exemplary embodiments are not intended to be limiting, and not all combinations of features described in the exemplary embodiments are essential for solutions in the disclosure. In the following description, a printer is used as an exemplary apparatus, but is not seen to be limiting.

An exemplary embodiment will be described below. A terminal apparatus and a communication apparatus according to the present exemplary embodiment will be described. In the present exemplary embodiment, a personal computer (PC) is described as an example of the terminal apparatus. The terminal is not limited to being a PC, and the terminal apparatus can be any apparatus capable of communicating with the communication apparatus described below. For example, a digital camera, a mobile phone, a smartphone, a tablet terminal, or a personal digital assistant (PDA) can be employed as the terminal apparatus. In the present exemplary embodiment, a multifunction printer (hereinafter, called as "MFP") capable of providing a copy service, a facsimile service, and a printing service will be described as an example of the communication apparatus. However, the communication apparatus is not limited thereto. Various apparatuses capable of communicating with the terminal apparatus can be employed as the communication apparatus. Examples of printers to which the present exemplary embodiment is applicable include an ink-jet printer, a full-color laser beam printer, or a monochrome printer. The present exemplary embodiment can also be applied to other apparatuses such as a copying machine, a facsimile apparatus, a smartphone, a mobile phone, a PC, a tablet terminal, a PDA, a digital camera, a music reproduction device, a storage device, a projector, and a smart-speaker, capable of providing services other than a printing service. The smart-speaker is an apparatus that instructs a device existing in the same network to execute processing according to an instruction vocally input by a user and notifies a user of information acquired via the network in response to a request vocally input by a user. The exemplary embodiment can also be applied to a single function printer (hereinafter, "SFP") having a single function.

System Configuration

Figure 1:
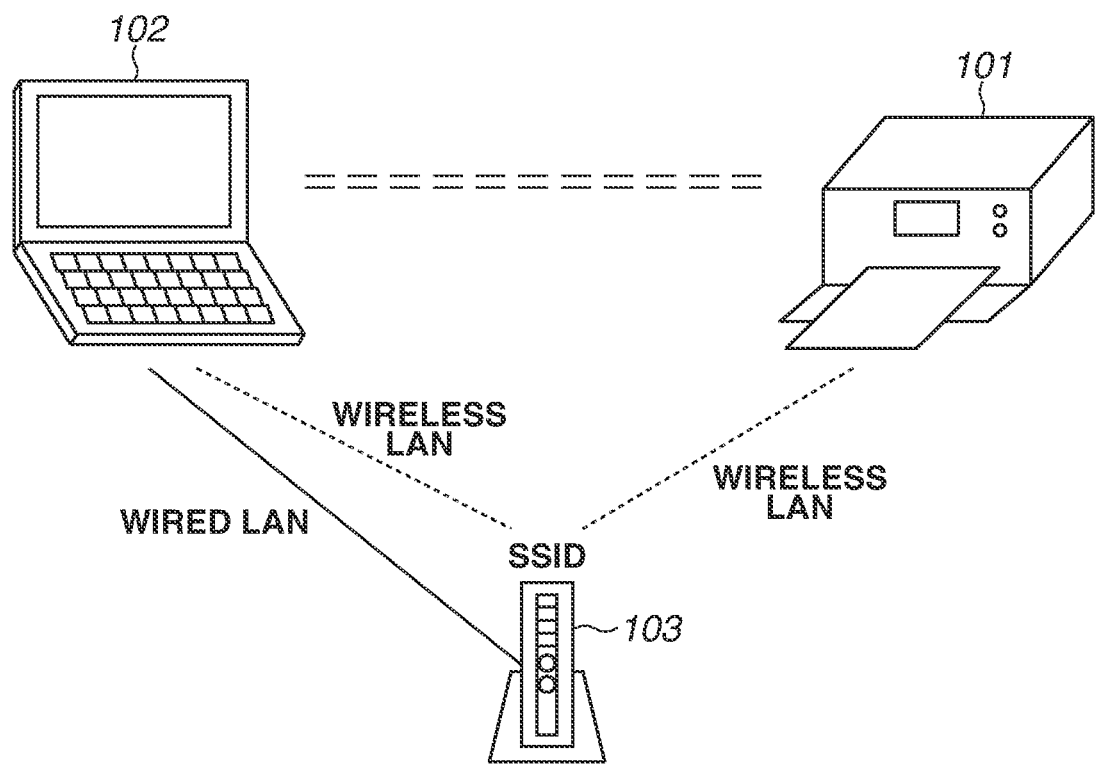
FIG. 1 is a diagram illustrating a system configuration according to an exemplary embodiment.

FIG. 1 is a diagram illustrating a system configuration of the present exemplary embodiment. An information processing apparatus 102 is a terminal apparatus according to the present exemplary embodiment. A communication apparatus 101 is a communication apparatus according to the present exemplary embodiment. An access point (AP) 103 is an external apparatus existing external to the information processing apparatus 102 and the communication apparatus 101. The external apparatus may be an apparatus capable of relaying communication, instead of an access point. Specifically, for example, the AP 103 is a device such as a wireless local area network (LAN) router.

The information processing apparatus 102 and the communication apparatus 101 is connectable to the AP 103. The information processing apparatus 102 can communicate with the communication apparatus 101 via the AP 103. A method for connecting a terminal apparatus and a communication apparatus via an AP is generally called "infrastructure connection". Through the infrastructure connection, a network environment where a plurality of devices can communicate with each other can be established. A connection method for directly connecting two devices, e.g., the terminal apparatus and the communication apparatus, without interposing an AP is called "direct connection".

In the present exemplary embodiment, an infrastructure connection or a direct connection between the information processing apparatus 102 and the communication apparatus 101 are assumed to be a connection using a communication method compliant with a standard of the Institute of Electrical and Electronics Engineers (IEEE) 802.11 series. Specifically, Wireless Fidelity (Wi-Fi®) is the communication method compliant with the standard of the IEEE 802.11 series. In addition, a communication method used for establishing a connection is not limited to the above, and Bluetooth® or Wi-Fi Aware™ can be used.

Figure 2:
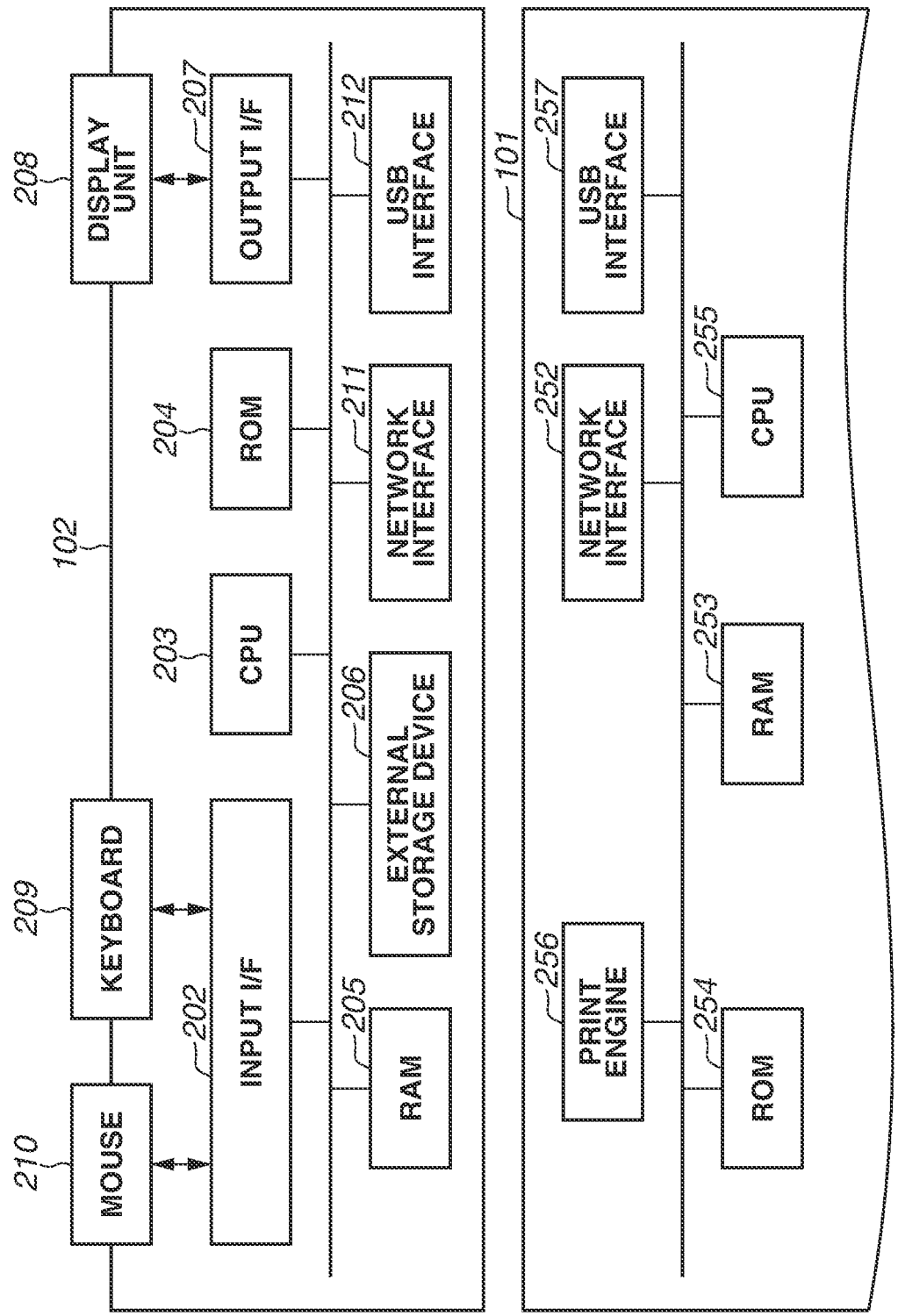
FIG. 2 is a block diagram illustrating hardware configurations of an information processing apparatus and a communication apparatus according to an exemplary embodiment.

Hardware configurations of the information processing apparatus 102 and the communication apparatus 101 will be described with reference to a block diagram in FIG. 2. In the present exemplary embodiment, while the following configurations will be described as examples, functions thereof are not be limited to those illustrated in FIG. 2.

The hardware configurations of the communication apparatus 101 and the information processing apparatus 102 will be described with reference to FIG. 2.

The information processing apparatus 102 includes an input interface (I/F) 202, a central processing unit (CPU) 203, a read only memory (ROM) 204, a random access memory (RAM) 205, an external storage device 206, an output I/F 207, a display unit 208, a keyboard 209, and a mouse 210. The CPU 203, the ROM 204, and the RAM 205 form a computer of the information processing apparatus 102. The information processing apparatus 102 also includes a network interface (first communication unit) 211 and a universal serial bus (USB) interface (second communication unit) 212.

The input I/F 202 is an interface that receives a data input and an operation instruction from a user, which are provided by the user operating the mouse 210 or the keyboard 209.

The CPU 203 is a system control unit serving as a processor for controlling the information processing apparatus 102.

The ROM 204 stores fixed data, such as a control program to be executed by the CPU 203, a data table, and an embedded operating system (hereinafter, referred to as "OS") program. In the present exemplary embodiment, software execution processing, such as scheduling, task switching, or interruption processing is executed through the control program stored in the ROM 204 under the management of the embedded OS stored in the ROM 204.

The RAM 205 includes a static random access memory (SRAM) that requires a back-up power supply. The data in the RAM 205 is maintained by a data backup primary battery (not illustrated), and thus, important data, such as a program-control variable, can be stored without being volatized. A memory area for storing setting information and management data about the information processing apparatus 102 is also provided on the RAM 205. The RAM 205 is also used as a main memory and a work memory for the CPU 203.

The external storage device 206 stores an application for providing a printing execution function and a print job generation program for generating a print job readable by the communication apparatus 101. The external storage device 206 stores various programs, such as an information transmission-reception control program for transmitting and receiving information to/from the communication apparatus 101 connected thereto via the network interface 211 or the USB interface 212 and various types of information used by the programs. In this exemplary embodiment, it is assumed that the below-described setup program is also stored in the external storage device 206.

The output I/F 207 is an interface for controlling the display unit 208 to display data and to notify a user about a state of the information processing apparatus 102.

The display unit 208 includes a light-emitting diode (LED) and a liquid crystal display (LCD), and displays data and notifies a user of a state of the information processing apparatus 102. The display unit can be provided with operation units, such as a numeric input key, a mode setting key, an enter key, a cancel key, and a power key, thus receiving an input from the user via the display unit 208.

The network interface 211 controls wireless communication and communication processing via a wired LAN cable. Specifically, the network interface 211 is configured to perform data communication by connecting to the communication apparatus 101 and/or an external apparatus existing external to the information processing apparatus 102 and the communication apparatus 101 through a wireless LAN or a wired LAN. For example, the network interface 211 is connectable to an access point (not illustrated) included in the communication apparatus 101. Connecting the network interface 211 and the access point in the communication apparatus 101 to each other enables the information processing apparatus 102 and the communication apparatus 101 to communicate with each other. The network interface 211 may directly communicate with the communication apparatus 101 through wireless communication or may communicate via an external apparatus existing external to the information processing apparatus 102 and the communication apparatus 101. Examples of the external apparatus include an external access point and an apparatus capable of relaying communication other than the access point. In the present exemplary embodiment, the Institute of Electrical and Electronics Engineers (IEEE) 802.11 series standard (Wi-Fi®) is used. However, for example, Bluetooth® can be used. Examples of the wireless communication method include the Wi-Fi® and Bluetooth®. Examples of the external access point include apparatuses such as a router. In the present exemplary embodiment, a method for directly connecting the information processing apparatus 102 and the communication apparatus 101 without interposing the external access point is referred to as "direct connection method". A method for connecting the information processing apparatus 102 and the communication apparatus 101 via the external access point is referred to as "infrastructure connection method". The information processing apparatus 102 can have a plurality of network interfaces 211 to support a plurality of communication methods. More specifically, the information processing apparatus 102 can have an interface for communicating through a near field wireless communication method, such as Bluetooth® Low Energy, Near Field Communication (NFC), or Wi-Fi Aware™. The information processing apparatus 102 does not necessarily have to include the network interface 211 for wireless communication. In other words, as the interfaces for communicating with the other apparatuses, the information processing apparatus 102 can only have the network interface 211 and the USB interface 212 (described below) for wired communication.

The USB interface 212 controls a USB connection established via a USB cable. Specifically, the USB interface 212 is configured to connect to the communication apparatus 101 and/or an apparatus, such as an external access point, via the USB to execute data communication therewith.

The communication apparatus 101 includes a network I/F (communication unit) 252, a RAM 253, a print engine 256, a ROM 254, a CPU 255, and a USB interface 257. The CPU 255, the RAM 253, and the ROM 254 form a computer of the communication apparatus 101.

The network interface 252 controls wireless communication processing and communication processing using a wired LAN cable. Specifically, as an internal access point of the communication apparatus 101, the network interface 252 includes an access point for connecting to an apparatus such as the information processing apparatus 102. This access point is connectable to the network interface 211 of the information processing apparatus 102. In addition, the network interface 252 can directly communicate with the information processing apparatus 102 through wireless communication, or can communicate via an external access point. In other words, the network interface 252 can operate as a slave unit connected to an external access point in addition to operating as an access point. In the present exemplary embodiment, the IEEE 802.11 series standard (Wi-Fi®) is used. Alternatively, Bluetooth® can be used. The network interface 252 can have a hardware device that functions as an access point, or can have software that causes the network interface 252 to function and operate as an access point. The communication apparatus 101 can include a plurality of network interfaces 252 in order to communicate through a plurality of communication methods. Specifically, for example, the communication apparatus 101 can include an interface for communicating through a near field wireless communication method such as Bluetooth® Low Energy, NFC, or Wi-Fi Aware™.

The RAM 253 includes an SRAM that requires a back-up power supply. The data in the RAM 253 is maintained by a data backup primary battery (not illustrated), and thus, important data, such as a program-control variable, can be stored without being volatized. A memory area for storing setting information and management data about the communication apparatus 101 is also provided on the RAM 253. The RAM 253 is also used as a main memory and a work memory for the CPU 255. The RAM 253 stores a receive buffer for temporarily saving printing information received from the information processing apparatus 102 and various information.

The ROM 254 stores fixed data, such as a control program to be executed by the CPU 255, a data table, and an OS program. In the present exemplary embodiment, software execution processing such as scheduling, task switching, or interruption processing is executed through the control program stored in the ROM 254 under the management of the embedded OS stored in the ROM 254.

The CPU 255 is a system control unit serving as a processor for controlling the communication apparatus 101.

The print engine 256 executes image forming processing of forming an image on a recording medium, such as paper, by applying a recording agent, such as ink, onto the recording medium based on information stored in the RAM 253 or a print job received from the information processing apparatus 102. The print engine 256 then outputs a print result. The print job causes the communication apparatus 101 to execute image forming processing.

In the present exemplary embodiment, the communication apparatus 101 uses at least one of frequency bands of 2.4 gigahertz (GHz) or 5 GHz for wireless connection based on the IEEE 802.11 series standard. The communication apparatus 101 has a communication channel corresponding to a usable frequency band. If the 2.4 GHz frequency band is useable, the communication apparatus 101 has 14 communication channels allocated to predetermined frequency bands in the 2.4 GHz frequency band. If the 5 GHz frequency band is useable, the communication apparatus 101 has 19 communication channels allocated to predetermined frequency bands in the 5 GHz frequency band.

While an example of processing allocation between the information processing apparatus 102 and the communication apparatus 101 has been described above, the allocation is not limited to the above description, and the processing can be allocated in another way.

In the present exemplary embodiment, the information processing apparatus 102 executes processing (network setting processing) for connecting the communication apparatus 101 to the AP.

As a method for connecting the communication apparatus 101 to the AP, a method has been available in which a Wi-Fi® connection is established between apparatuses with connection information (in particular, a password) for connecting the communication apparatus 101 to the AP not being received by the user. Such a method is called "simple connection processing". More specifically, the simple connection processing refers to, for example, connection processing based on a standard of AirStation™ One-Touch Secure System (AOSS), Rakuraku Wireless LAN Start®, or Wi-Fi Protected Setup™ (WPS). In the present exemplary embodiment, it is assumed that connection processing based on the WPS is used as the simple connection processing.

When the simple connection processing is started, an apparatus (AP) that serves as a master unit in the connection established by the simple connection processing broadcasts a predetermined beacon based on the standard for the simple connection processing to notify a partner apparatus that the simple connection processing is being executed. The predetermined beacon is receivable by a partner apparatus (communication apparatus 101) with which the simple connection processing is being executed. In a case where the simple connection processing is the connection processing based on WPS, a state where the simple connection processing is being executed by the AP is referred to as a WPS mode. When the simple connection processing is started, to search for an AP that is executing the simple connection processing, the partner apparatus (communication apparatus 101) to be served as a slave unit in the connection established through the simple connection processing searches for a predetermined beacon issued by an AP that is executing the simple connection processing. In a case where the communication apparatus 101 receives a predetermined beacon while executing the simple connection processing, connection setting with respect to the AP (i.e., transmission/reception of AP information) is made, and the communication apparatus 101 is connected to the AP through Wi-Fi®.

Examples of a method for executing the simple connection processing include a push button configuration (PBC) method and a personal identification number (PIN) code method. In the PBC method, the simple connection processing is started by the user executing an operation for the simple connection processing, such as pressing of a predetermined button, on both the communication apparatus 101 and the AP within a predetermined period. In the PIN code method, the user starts the simple connection processing by inputting a PIN code of the AP to the communication apparatus 101. In the present exemplary embodiment, the communication apparatus 101 receives a user input indicating whether the PBC method or the PIN code method is used for starting the simple connection processing via a screen displayed by the communication apparatus 101, and starts executing the simple connection processing through the method indicated by the received input.

In both the PBC method and the PIN code method, a user needs to operate the communication apparatus 101 directly. Therefore, starting the simple connection processing through the PBC method or the PIN code method has an issue in that much time and effort of the user is required, and that the communication apparatus 101 and the AP have to be placed at positions where the user can promptly operate both of the apparatuses within a predetermined period.

Thus, in the present exemplary embodiment, the information processing apparatus 102 transmits an instruction to execute the simple connection processing to the communication apparatus 101 to cause the communication apparatus 101 to start executing the simple connection processing without an operation of the user performed on the communication apparatus 101. With this configuration, the information processing apparatus 102 can simply connect the communication apparatus 101 to the AP.

Not all types of APs and communication apparatuses 101 always support the simple connection processing (i.e., simple connection processing is not always executable). In a case where the AP or the communication apparatus 101 does not support the simple connection processing, the information processing apparatus 102 cannot connect the communication apparatus 101 to the AP even if the instruction to execute the simple connection processing is transmitted to the communication apparatus 101.

The present exemplary embodiment provides an approach, as described below, where the information processing apparatus 102 checks whether the AP and the communication apparatus 101 support the simple connection processing.

To execute the simple connection processing, a user has to perform an operation for the simple connection processing for the AP in addition to a transmission of an instruction to execute the simple connection processing to the communication apparatus 101. However, the user who is executing the network setting processing through the information processing apparatus 102 is less likely to recognize that the user operation for the simple connection processing has to be executed on the AP.

Thus, in the present exemplary embodiment, a description will be provided of a configuration in which the information processing apparatus 102 executes notification processing for prompting the user to perform an operation for executing the simple connection processing on the AP.

Figure 3:
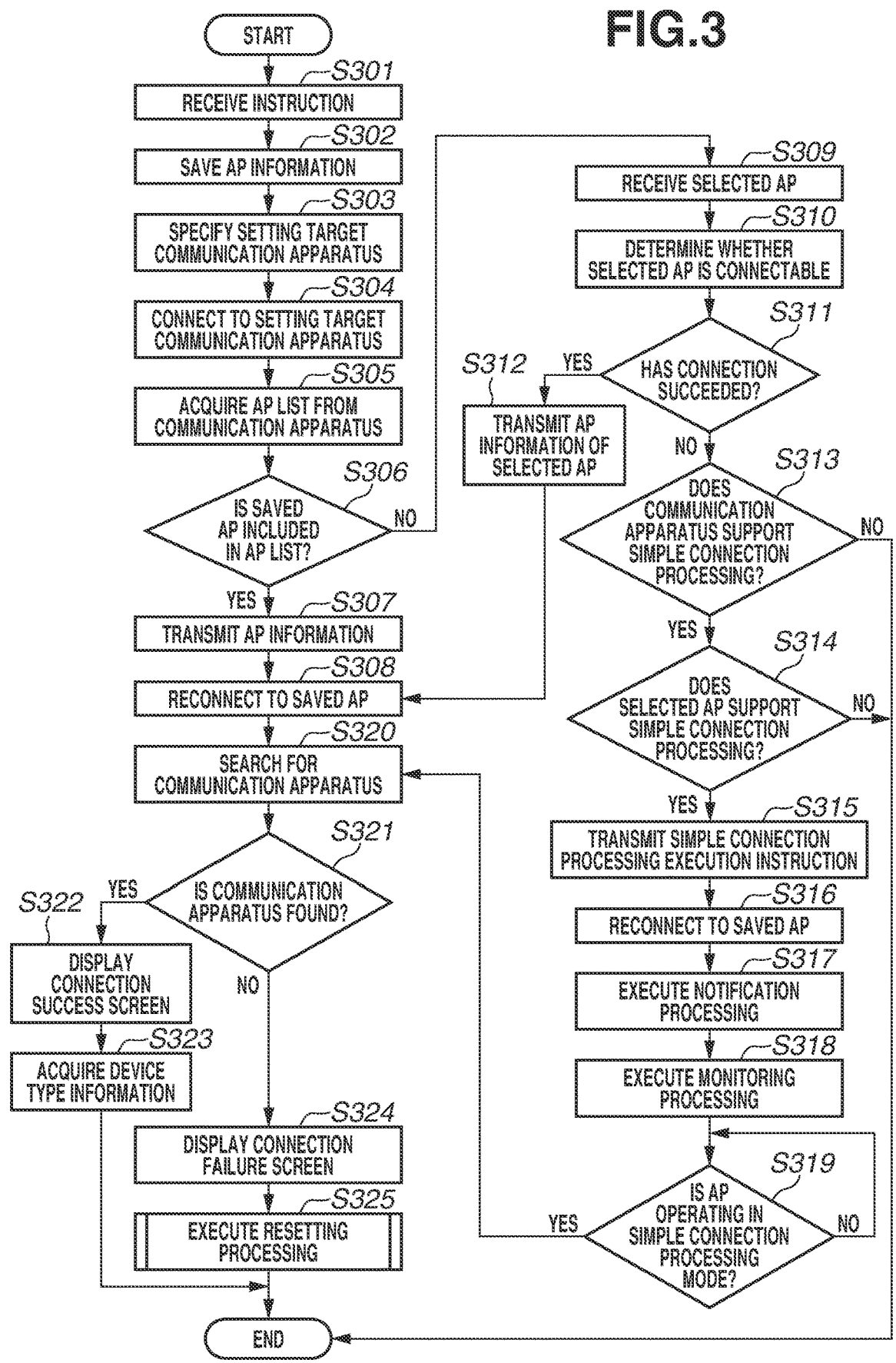
FIG. 3 is a flowchart illustrating network setting processing that is executed by the information processing apparatus according to an exemplary embodiment.

FIG. 3 is a flowchart illustrating network setting processing to be executed by the information processing apparatus 102. The flowchart illustrated in FIG. 3 is implemented by, for example, the CPU 203 reading out a program stored in the ROM 204 or the external storage device 206 to the RAM 205 and executing the program. Specifically, the processing illustrated in the flowchart in FIG. 3 is implemented by a setup program for executing network setting processing. The flowchart in FIG. 3 is started when a connection between the information processing apparatus 102 and any AP (herein, AP 103) is detected.

In step S301, the CPU 203 receives a user operation (instruction to execute network setting processing) that triggers execution of the network setting processing via a screen displayed by the setup program.

In step S302, the CPU 203 saves the AP information about the AP 103 to which the information processing apparatus 102 is currently connected (i.e., the AP 103 to which the information processing apparatus 102 is connected when the instruction to execute the network setting processing is received). The AP information includes connection information for connecting to the AP 103 (e.g., a service set identifier (SSID) and a password) and information about a frequency to be used for connecting to the AP 103.

In step S303, the CPU 203 specifies an apparatus to be a target of the network setting processing. Specifically, the CPU 203 acquires information about an apparatus near the information processing apparatus 102 by using an application program interface (API) of the OS included in the information processing apparatus 102. More specifically, the CPU 203 acquires information about an apparatus found through the network interface 211 (i.e., Wi-Fi®) or an apparatus connected to the information processing apparatus 102 through the USB interface 212. The CPU 203 then displays a list of apparatuses connected to the interface of the information processing apparatus 102 on the display unit 208 by using the acquired information. Examples of apparatuses to be searched for by the network interface 211 include an apparatus operating as an access point and an apparatus participating in the network in which the information processing apparatus 102 participates. In the present exemplary embodiment, in a case where the user performs the network setting processing on the communication apparatus 101, the user operates the communication apparatus 101 in a predetermined mode, referred to as "setup mode". More specifically, the user performs a predetermined operation for causing the communication apparatus 101 to operate in the setup mode on a display unit or a hard button of the communication apparatus 101 to cause the communication apparatus 101 to operate in the setup mode. The communication apparatus 101 can operate in the setup mode in response to the user initially turning on the power of the communication apparatus 101 in a state where an initial setting of the communication apparatus 101 has not been completed (i.e., arrival state). In the setup mode, the communication apparatus 101 can accept network setting processing, and the communication apparatus 101 operates as a predetermined access point having a predetermined SSID. When the communication apparatus 101 operates in the setup mode, the communication apparatus 101 is displayed on the list because the network interface 211 finds the communication apparatus 101 through the searching. In some cases, the information processing apparatus 102 may not have the network interface 211 for wireless communication, or the network interface 211 for wired communication may not be connected to any apparatus. In such cases, only an apparatus that is connected to the information processing apparatus 102 through the USB interface 212 is displayed on the list. The user selects the communication apparatus 101 from the displayed list so that the CPU 203 specifies the communication apparatus 101 as a target apparatus for the network setting processing. At this time, an apparatus found through Wi-Fi® and an apparatus found through the USB can be displayed on the list in a distinguishable manner.

In step S304, the CPU 203 connects the information processing apparatus 102 to the communication apparatus 101 specified as the target apparatus for the network setting processing. At this time, for example, if the apparatus specified as the target for the network setting processing is the communication apparatus 101 that is operating in the setup mode, the information processing apparatus 102 is directly connected to the communication apparatus 101 through Wi-Fi®. Thus, if the information processing apparatus 102 is connected to the AP 103, the CPU 203 temporarily disconnects the connection, and makes the information processing apparatus 102 directly connect to the communication apparatus 101 through Wi-Fi®.

In step S305, the CPU 203 acquires a list of APs to which the communication apparatus 101 is connectable, from the communication apparatus 101 via the direct connection. This list is a list of APs that the communication apparatus 101 has found by the searching through Wi-Fi® before the communication apparatus 101 shifts to the setup mode, and includes AP information (e.g., SSID) about the found APs. The AP information does not include a password. At this time, the CPU 203 also acquires frequency band information about a frequency band usable by the communication apparatus 101 and setting information indicating whether the communication apparatus 101 supports the simple connection processing from the communication apparatus 101.

In step S306, based on the AP information saved in step S302, the CPU 203 determines whether the list acquired in step S305 includes the AP (herein, the AP 103) to which the information processing apparatus 102 is connected when the instruction to execute network setting processing is received. As described above, the list acquired in step S305 is a list of access points to which the communication apparatus 101 is connectable. Thus, the determination made in step S306 can be regarded as a determination whether the communication apparatus 101 is connectable to the AP to which the information processing apparatus 102 is connected when the instruction to execute the network setting processing is received. For example, if the AP 103 is not included in the list acquired in step S305, the communication apparatus 101 is not connectable to the AP 103. If the AP 103 is included in the list acquired in step S305, the communication apparatus 101 is connectable to the AP 103. A case will be described as follows, in which the list acquired in step S305 does not include the AP to which the information processing apparatus 102 is connected when the instruction to execute the network setting processing is received. Examples of such a case include a case where the communication apparatus 101 does not support a predetermined frequency band such as 5 GHz, and the AP to which the information processing apparatus 102 is connected when the instruction to execute the network setting processing is received is an AP that uses that predetermined frequency band. Another example is a case where the AP to which the information processing apparatus 102 is connected when the instruction to execute the network setting processing is received is operating in a stealth mode, and thus the AP cannot be found by the searching through Wi-Fi®. If the determination result is "YES" (YES in step S306), the processing proceeds to step S307. If the determination result is "NO" (NO in step S306), the processing proceeds to step S309.

If the determination result is "YES" in step S306, in step S307, the CPU 203 transmits the AP information saved in step S302 to the communication apparatus 101 through the direct connection between the communication apparatus 101 and the information processing apparatus 102.

In step S308, the CPU 203 cancels the direct connection between the communication apparatus 101 and the information processing apparatus 102. The CPU 203 then re-establishes the connection between the information processing apparatus 102 and the AP 103 to which the information processing apparatus 102 is connected when the instruction to execute the network setting processing is received, based on the AP information stored in step S302. Assume that AP information about an AP different from the AP 103 to which the information processing apparatus 102 is connected when the instruction to execute the network setting processing is received has been transmitted to the communication apparatus 101 from the CPU 203 in step S312 (described below). In such a case, the CPU 203 can establish a connection between the information processing apparatus 102 and the AP corresponding to that AP information by using the AP information transmitted to the communication apparatus 101. The CPU 203 then advances the processing to step S320.

Figure 8A:
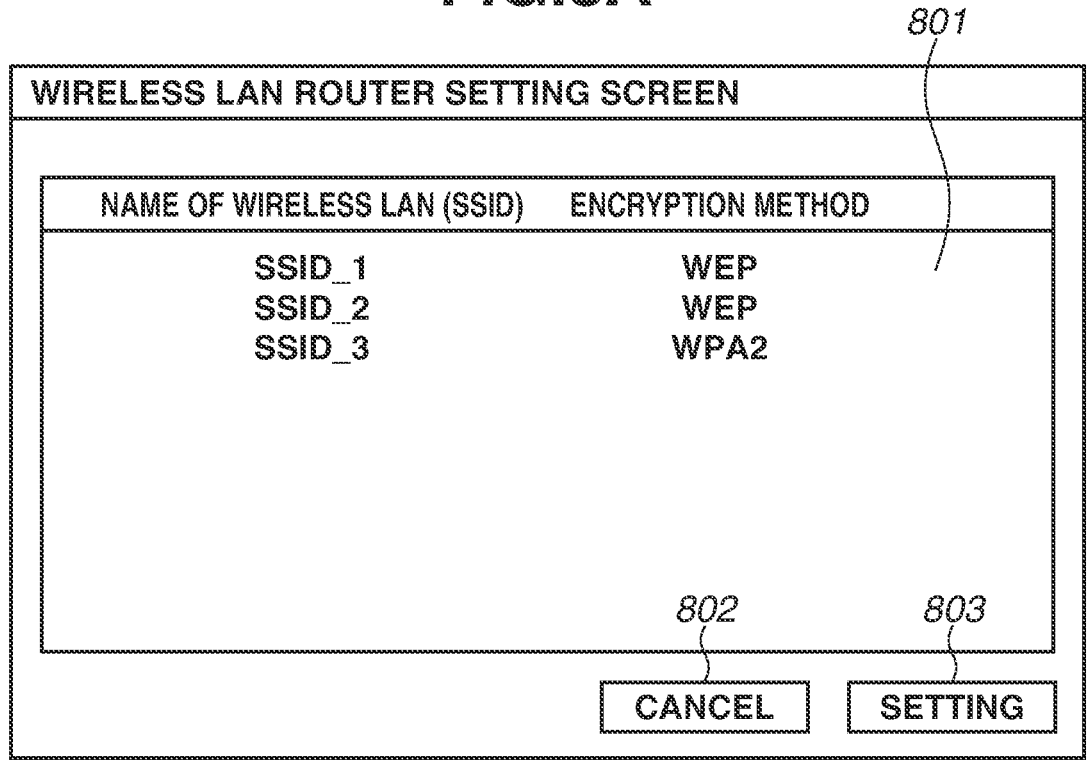
FIGS. 8A and 8B are diagrams illustrating an access point (AP) selection screen and a password input screen, respectively, according to an exemplary embodiment.
Figure 8B:
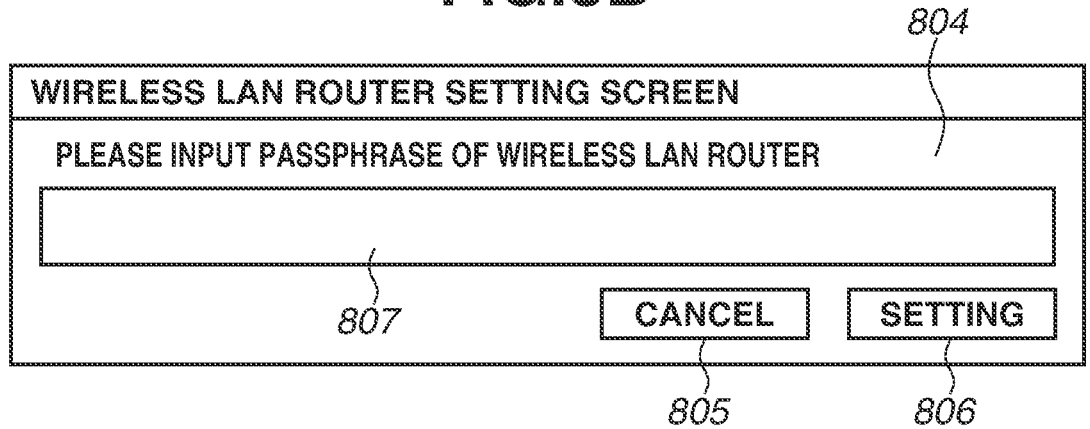

If the determination result is "NO" in step S306, the processing proceeds to step S309. In step S309, the CPU 203 receives an input of a selected AP to which the communication apparatus 101 is to be connected. Specifically, the CPU 203 displays an AP selection screen 801 (FIG. 8A) having the list acquired in step S305 on the display unit 208, and prompts the user to select an AP from the list. The SSIDs and encryption methods of the APs included in the list acquired in step S305 are displayed on the AP selection screen 801. The present exemplary embodiment is not limited to this configuration, and information about a frequency band that the AP included in the list acquired in step S305 uses for the wireless connection can be displayed thereon. The CPU 203 prompts the user to select any one of the APs from the list, and specifies the selected AP as a connection destination of the communication apparatus 101. At this time, the CPU 203 also displays a cancel button 802 for cancelling the network setting processing together with the list. If the cancel button 802 is selected, the CPU 203 ends the processing. If a setting button 803 is selected, the CPU 203 displays a password (passphrase) input screen 804 in FIG. 8B on the display unit 208. The CPU 203 receives an input of a password for connecting to the selected AP from the user via an input area 807. At this time, a list of APs found through the searching executed by the information processing apparatus 102 can be displayed instead of a list of APs found through the searching executed by the communication apparatus 101.

Figure 9:
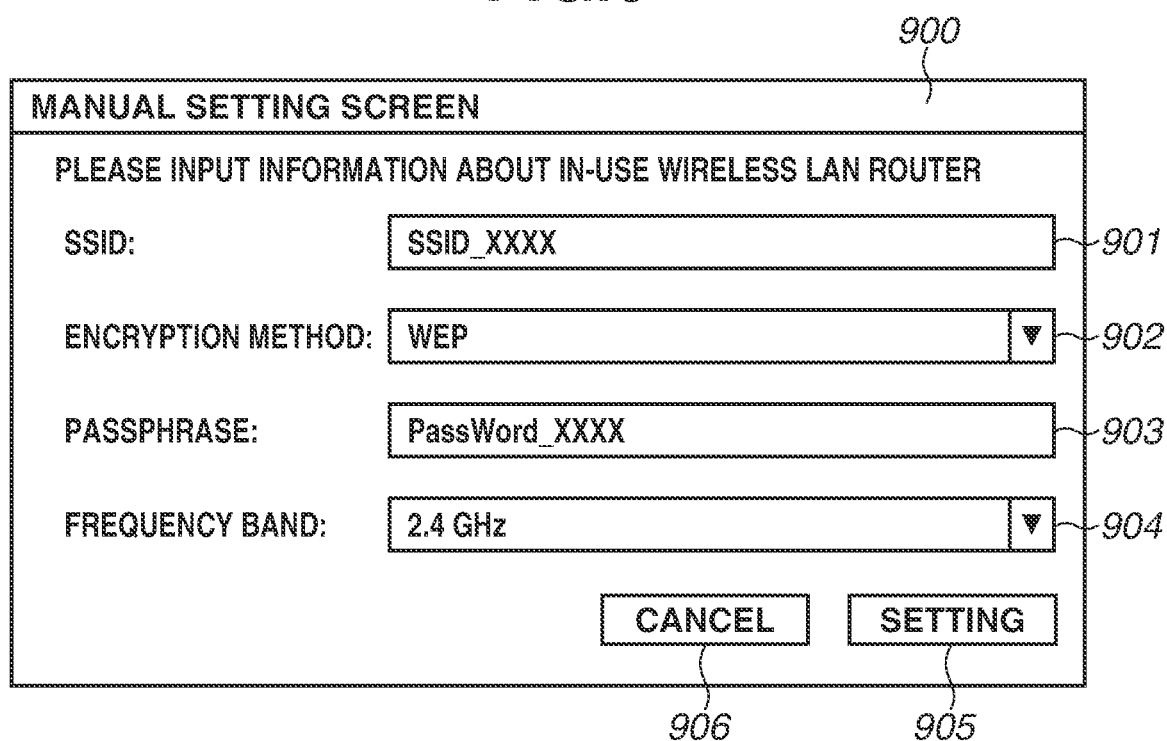
FIG. 9 is a diagram illustrating a manual input screen according to an exemplary embodiment.

In step S309, the CPU 203 does not necessarily have to prompts the user to select the AP from the list acquired in step S305. Specifically, for example, the CPU 203 can display a manual input screen 900 (FIG. 9) on the display unit 208 to enable the user to select an AP by manually inputting the AP information to receive a user input of the selected AP through the manual input screen 900. Input areas 901 to 904 are areas for receiving the user input of information about the AP to which the communication apparatus 101 is to be connected (e.g., an SSD, an encryption method, a password, and a frequency band information). The AP based on the information input via the manual input screen 900 is specified as a connection destination of the communication apparatus 101. In addition, the manual input screen 900 can be displayed when a specific button (not illustrated) included in the AP selection screen 801 is pressed.

In step S310, the CPU 203 determines whether the Wi-Fi® connection can be established between the AP selected in step S309 and the information processing apparatus 102 (i.e., connection checking processing). Specifically, the CPU 203 initially temporarily cancels the direct connection between the communication apparatus 101 and the information processing apparatus 102. The CPU 203 then executes processing for connecting the information processing apparatus 102 to the AP selected in step S309 through Wi-Fi® by using the information (the SSID and the password) received in step S309. If the information received in step S309 is correct, the Wi-Fi® connection between the AP selected in step S309 and the information processing apparatus 102 is established successfully. If the information received in step S309 is incorrect, establishment of the Wi-Fi® connection between the AP selected in step S309 and the information processing apparatus 102 fails. After the CPU 203 specifies success or failure in establishment of the connection between the AP selected in step S309 and the information processing apparatus 102, the CPU 203 re-establishes the direct connection between the communication apparatus 101 and the information processing apparatus 102.

In step S309, if the AP is selected through the manual input screen 900, the frequency band used by the AP selected in step S309 may not correspond to the frequency band that is useable by the communication apparatus 101 in some cases. Thus, if the AP is selected through the manual input screen 900, in step S310, the CPU 203 can determine whether the frequency band used by the AP selected in step S309 corresponds to the frequency band that is useable by the communication apparatus 101 based on the frequency band information acquired in step S305. If the determination result is "YES", the CPU 203 can execute the connection checking processing and execute processing in the latter stage based on a result of the connection checking processing. If the determination result is "NO", the CPU 203 can execute the processing in the latter stage by taking the determination result as a failure in establishment of the connection between the AP selected in step S309 and the information processing apparatus 102.

In step S311, the CPU 203 determines whether a connection between the AP selected in step S309 and the information processing apparatus 102 is established successfully. If the determination result is "YES" (YES in step S311), the processing proceeds to step S312. If the determination result is "NO" (NO in step S311), the processing proceeds to step S313.

If the determination result is "YES" in step S311, in step S312, the CPU 203 transmits the AP information (i.e., the SSID and the password) about the AP selected in step S309 via a direct connection between the communication apparatus 101 and the information processing apparatus 102. The processing then proceeds to step S308.

If the determination result is "NO" in step S311, in step S313, the CPU 203 determines whether the communication apparatus 101 supports the simple connection processing based on the setting information acquired in step S305. If the determination result is "YES"(YES in step S313), the processing proceeds to step S314. If the determination result is "NO" (NO in step S313), the CPU 203 ends the processing because the communication apparatus 101 is not connectable to the AP.

In step S314, the CPU 203 determines whether the AP selected in step S309 supports the simple connection processing. Specifically, the CPU 203 transmits a probe request to make an inquiry to the AP selected in step S309, specifying the SSID of the AP selected in step S309. In response to the probe request, the CPU 203 receives a probe response from the AP. The probe response includes the information indicating whether the communication apparatus 101 supports the simple connection processing, such as the WPS. The CPU 203 then makes the determination in step S314 based on the acquired information. This determination is made because not all types of APs support the simple connection processing. In addition, in some existing APs, enabling and disenabling of the simple connection processing function is settable. This determination is made because, if the simple connection processing function is set to be disabled in such an AP, this AP cannot execute the simple connection processing even though the AP receives a user operation for executing the simple connection processing. If the determination result is "YES" (YES in step S314), the processing proceeds to step S315. If the determination result is "NO" (NO in step S314), the CPU 203 ends the processing because the communication apparatus 101 is not connectable to the AP.

In step S315, the CPU 203 transmits an execution instruction to cause the communication apparatus 101 to execute the simple connection processing (execution instruction for simple connection processing) to the communication apparatus 101 via the direct connection between the communication apparatus 101 and the information processing apparatus 102.

In step S316, the CPU 203 cancels the direct connection between the communication apparatus 101 and the information processing apparatus 102. The CPU 203 then re-establishes a connection between the information processing apparatus 102 and the AP 103 to which the information processing apparatus 102 is connected when the instruction to execute the network setting processing is received, based on the AP information stored in step S302. At this time, the CPU 203 can establish a connection between the AP selected in step S309 and the information processing apparatus 102.

Figure 6:
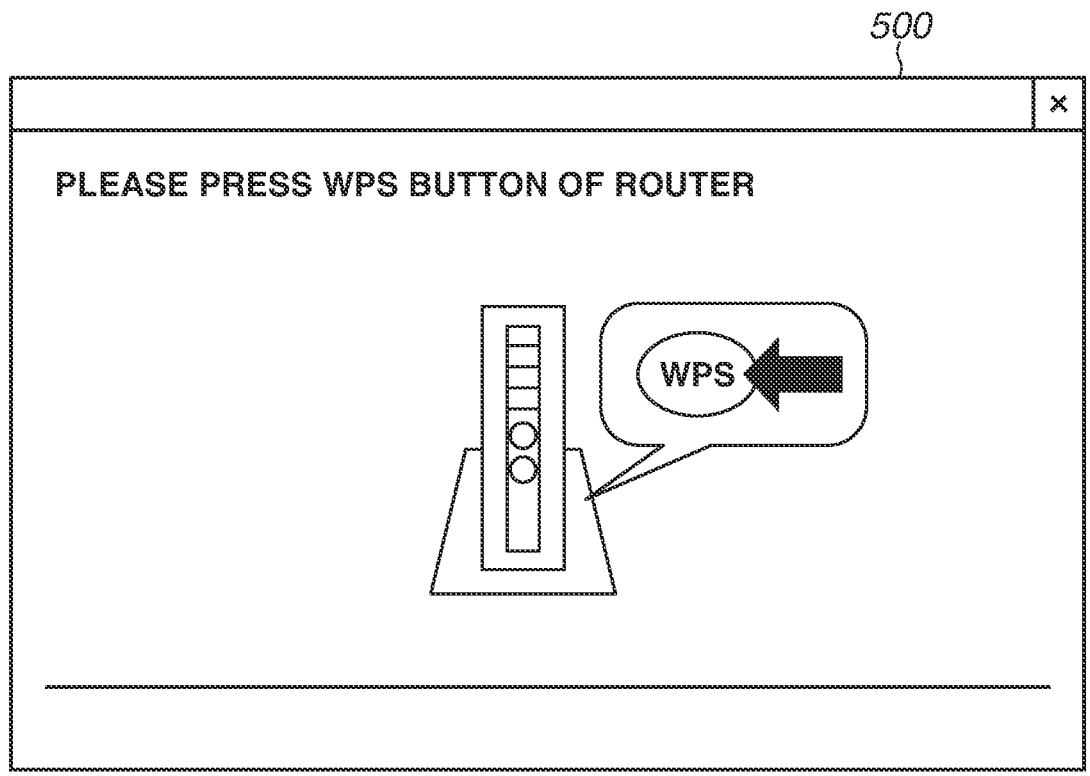
FIG. 6 is a diagram illustrating a notification screen according to an exemplary embodiment.

In step S317, the CPU 203 executes notification processing for prompting the user to perform an operation for executing the simple connection processing with respect to the AP selected in step S309 (e.g., a pressing operation of a WPS button arranged on the AP). Specifically, the CPU 203 displays a notification screen 500 as illustrated in FIG. 6 on the display unit 208 as the notification processing. In addition, identification information (e.g., an SSID) about the AP selected in step S309 can be displayed on the notification screen 500. The notification screen 500 can also include an area having a detail description of the operation for executing the simple connection processing and a button for newly displaying this area. When this button is pressed, for example, the area is displayed as Internet content through a web browser because the connection to the AP has been re-established in step S316, and thus the information processing apparatus 102 can communicate through the Internet.

In step S318, the CPU 203 starts processing for monitoring whether the AP selected in step S309 is executing the simple connection processing. Specifically, the CPU 203 starts transmitting a probe request to the AP selected in step S309. In response to the probe request, the CPU 203 receives a probe response from the AP.

In step S319, the CPU 203 determines whether the AP selected in step S309 is executing the simple connection processing based on the information included in the probe response. The probe response includes information indicating whether the AP is executing the simple connection processing and broadcasting a predetermined beacon (e.g., whether the AP is operating in the WPS mode). The CPU 203 has transmitted the instruction to execute the simple connection processing to the communication apparatus 101 in step S315, and thus, the simple connection processing is executed by the communication apparatus 101 and the AP selected in step S309 if the determination result is "YES". Then, a connection is established between the communication apparatus 101 and the AP selected in step S309 through Wi-Fi®. If the determination result is "YES" (YES in step S319), the processing proceeds to step S320. If the determination result is "NO" (NO in step S319), the CPU 203 repeatedly executes the processing until a determination of "YES" is made.

In step S320, the CPU 203 executes processing for searching for the communication apparatus 101 for a predetermined period through the Wi-Fi® connection between the information processing apparatus 102 and the AP (here, the AP 103) to which the information processing apparatus 102 is currently connected. If the communication apparatus 101 is also connected to the AP 103 based on the AP information transmitted in step S307 or S312, the CPU 203 can find the communication apparatus 101 through the search executed in step S320. In a case where the AP 103 supports two frequency bands (i.e., 2.4 GHz and 5 GHz), both the AP selected in step S309 and the AP to which the information processing apparatus 102 is reconnected can be the AP 103. In other words, the information processing apparatus 102 and the communication apparatus 101 can be connected to the same AP through different frequency bands. In such a case, the CPU 203 can also find the communication apparatus 101 through the search executed in step S320. In some cases, for example, the AP selected in step S309 different from the AP 103 and the AP 103 can be connected to each other, and the information processing apparatus 102 and the communication apparatus 101 can be connected via the two APs. In such a case, the CPU 203 can also find the communication apparatus 101 through the search executed in step S320. In a case where the AP selected in step S309 different from the AP 103 and the AP 103 are not connected to each other, or a privacy separator function of the AP 103 is enabled even though the AP selected in step S309 is identical to the AP 103, the CPU 203 cannot find the communication apparatus 101.

In step S321, the CPU 203 determines whether the communication apparatus 101 is found through the search executed in step S320. If the determination result is "YES", this indicates success in establishment of the infrastructure connection between the information processing apparatus 102 and the communication apparatus 101. If the determination result is "NO", this indicates failure in establishment of the infrastructure connection between the information processing apparatus 102 and the communication apparatus 101. If the determination result is "YES" (YES in step S321), the processing proceeds to step S322. If the determination result is "NO" (NO in step S321), the processing proceeds to step S324.

Figure 7A:
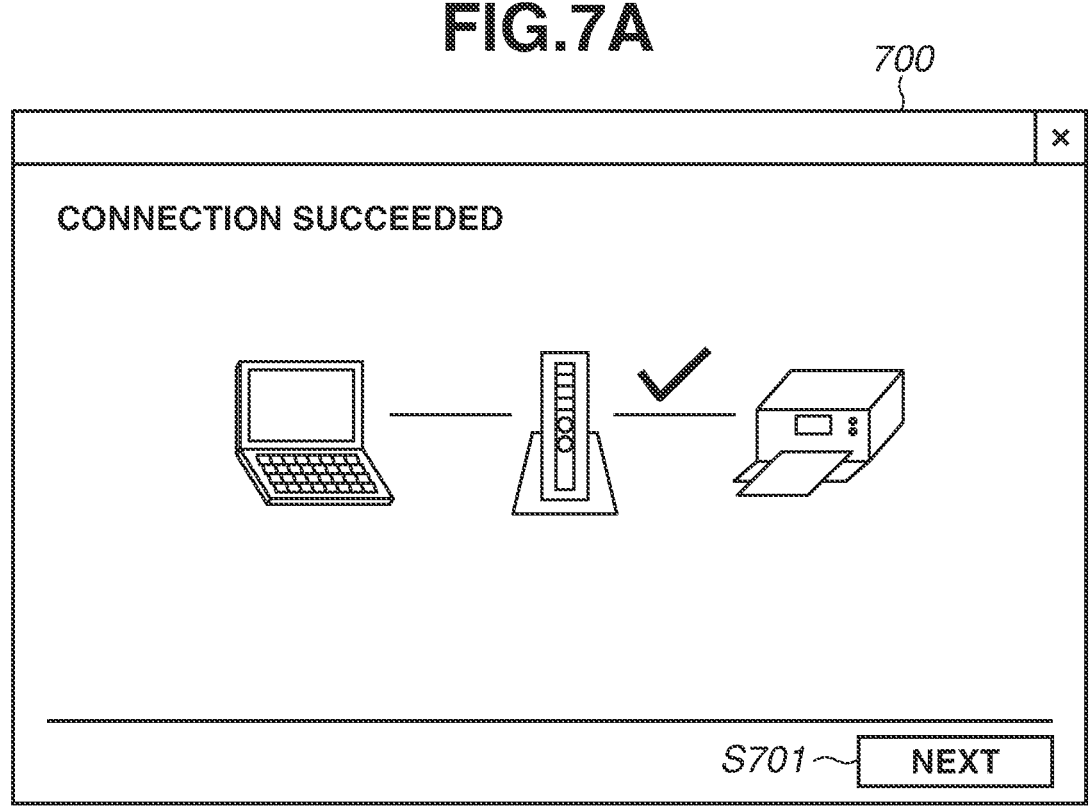
FIGS. 7A and 7B are diagrams illustrating a connection success screen and a connection failure screen, respectively, according to an exemplary embodiment.

If the determination result is "YES" in step S321, in step S322, the CPU 203 displays a connection success screen 700 indicating success in establishment of the infrastructure connection between the information processing apparatus 102 and the communication apparatus 101, as illustrated FIG. 7A.

In step S323 the CPU 203 acquires information about a type of the communication apparatus 101 from the found communication apparatus 101. The CPU 203 then executes processing for installing a printer driver corresponding to the communication apparatus 101 in the information processing apparatus 102, based on the information. The CPU 203 then ends the processing.

Figure 7B:
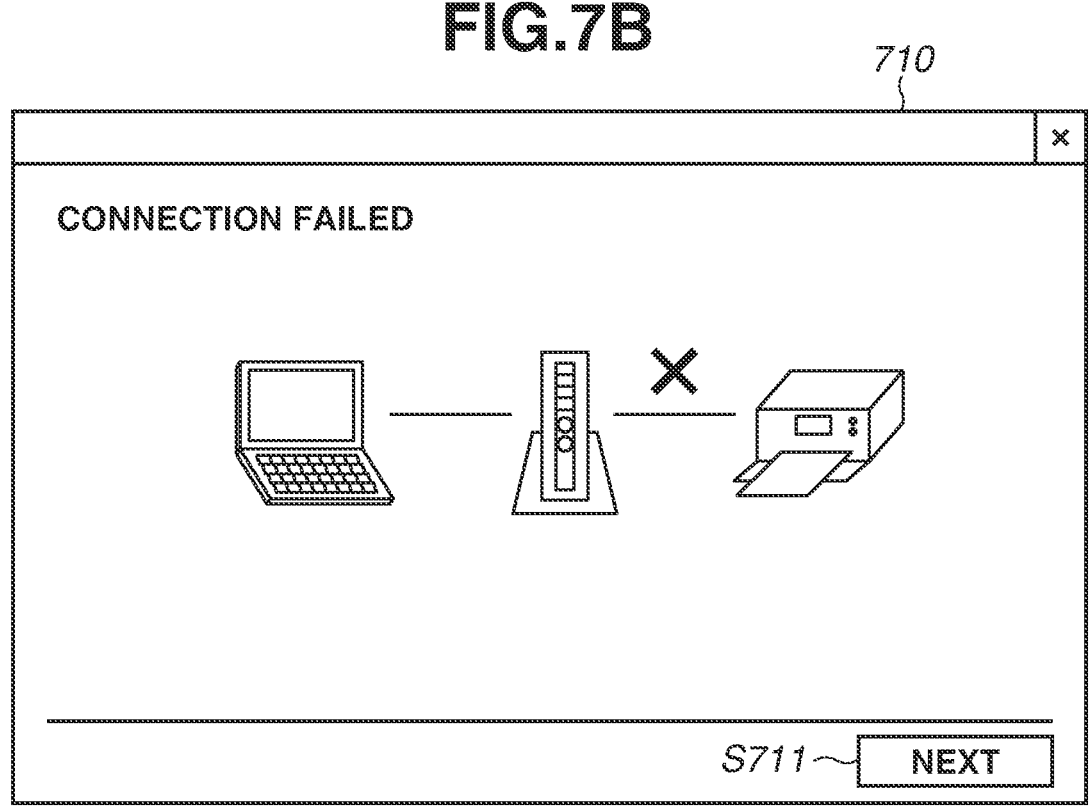

If the determination result is "NO" in step S321, in step S324, the CPU 203 displays a connection failure screen 710 indicating failure in establishment of the infrastructure connection between the information processing apparatus 102 and the communication apparatus 101 as illustrated in FIG. 7B. The connection failure screen 710 can include an area in which a method of specifying a cause of failure in establishment of the infrastructure connection and/or a method of successfully establishing the infrastructure connection are indicated as well as a button for newly displaying this area.

In step S325, the CPU 203 executes the network re-setting processing described below and ends the processing.

Figure 4:
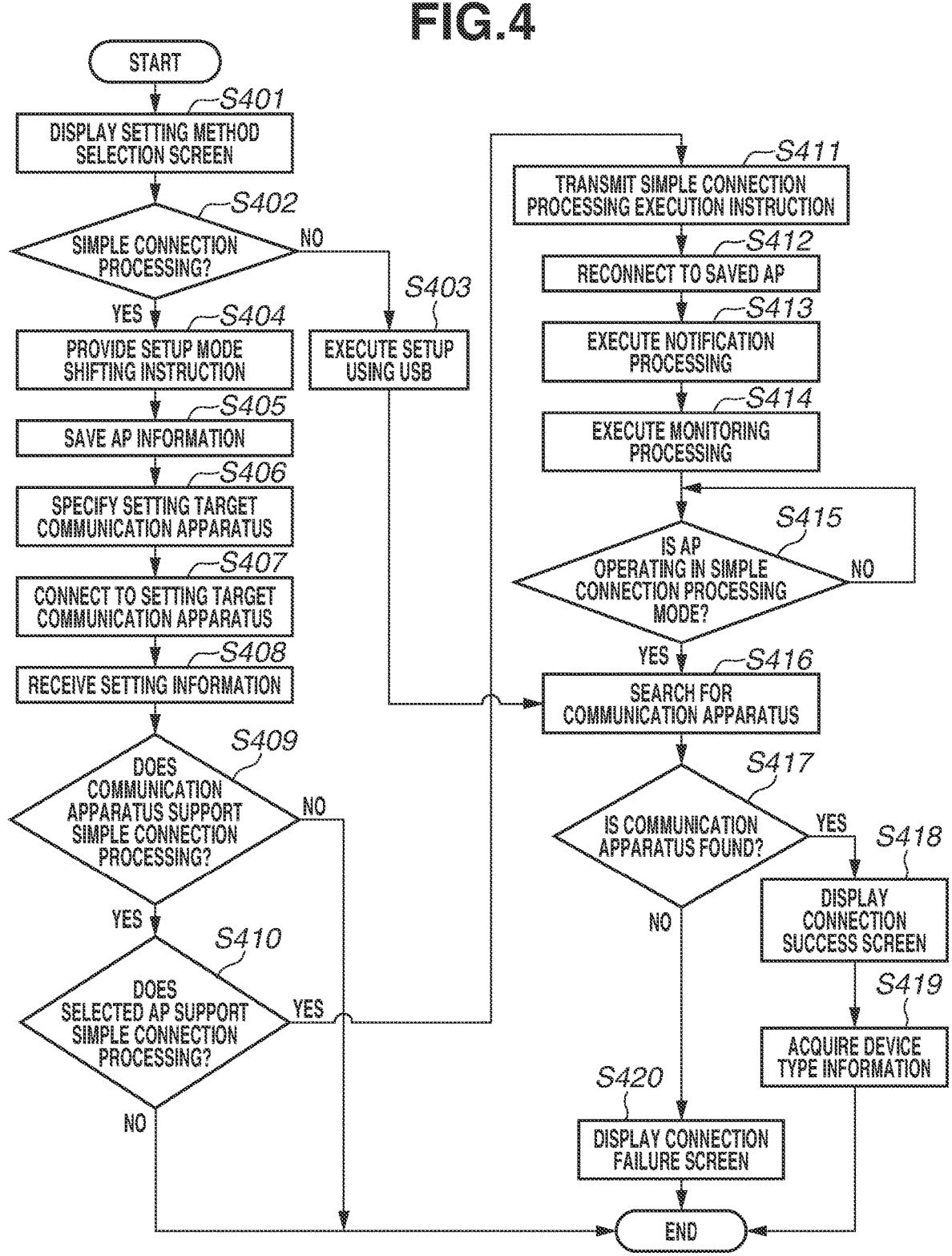
FIG. 4 is a flowchart illustrating network resetting processing that is executed by the information processing apparatus according to an exemplary embodiment.

FIG. 4 is a flowchart illustrating network resetting processing to be executed by the information processing apparatus 102 in step S325. The flowchart illustrated in FIG. 4 is implemented by the CPU 203 reading out a program stored in the ROM 204 or the external storage device 206 to the RAM 205 and executing the program.

First, in step S401, the CPU 203 receives a setting method to be used for the network resetting processing, selected by the user. Specifically, the CPU 203 displays a screen for the user to select either a setting method using a USB or a setting method with the simple connection processing, and receives the user selection via the screen.

In step S402, the CPU 203 determines whether the setting method with the simple connection processing is selected in step S401. If the determination result is "YES" (YES in step S402), the processing proceeds to step S404. If the determination result is "NO" (NO in step S402), the processing proceeds to step S403.

If the determination result is "NO" in step S402, in step S403, the CPU 203 transmits the AP information to the communication apparatus 101 by using the USB. The AP information transmitted in step S403 can be AP information about the AP to which the communication apparatus 101 is connected, or AP information about any AP included in the AP list acquired from the communication apparatus 101. The CPU 203 then executes the processing in step S416.

If the determination result is "YES" in step S402, the processing proceeds to step S404. In step S404, the CPU 203 displays, on the display unit 208, a screen for notifying the user that the communication apparatus 101 is to be shifted to a setup mode.

In step S405, the CPU 203 stores the AP information about the AP (here, the AP 103) to which the information processing apparatus 102 is currently connected. This process is similar to that in step S302.

In step S406, the CPU 203 specifies an apparatus as a target of the network setting processing. This process is similar to that in step S303.

In step S407, the CPU 203 connects the information processing apparatus 102 to the communication apparatus 101 specified as a target of the network setting processing. This process is similar to that in step S304.

In step S408, the CPU 203 acquires frequency band information about a frequency band that is useable by the communication apparatus 101 and setting information indicating whether the communication apparatus 101 supports the simple connection processing from the communication apparatus 101.

In step S409, the CPU 203 determines whether the communication apparatus 101 supports the simple connection processing based on the setting information acquired in step S408. If the determination result is "YES" (YES in step S409), the processing proceeds to step S410. If the determination result is "NO" (NO in step S409), the CPU 203 ends the processing because the communication apparatus 101 is not connectable to the AP.

In step S410, the CPU 203 determines whether the AP 103 corresponding to the AP information stored in step S405 supports the simple connection processing. This process is similar to that in step S314. If there is a different AP having an SSID the same as the SSID of the AP 103, the CPU 203 also receives a probe request from this different AP. In such a case, the CPU 203 specifies a probe response including a basic service set identifier (BSSID) of the AP 103 from among the plurality of received probe responses. The CPU 203 then makes the determination in step S410 based on the specified probe response. If the determination result is "YES" (YES in step S410), the processing proceeds to step S411. If the determination result is "NO" (NO in step S410), the CPU 203 ends the processing because the communication apparatus 101 is not connectable to the AP.

In step S411, the CPU 203 transmits the instruction to execute the simple connection processing to the communication apparatus 101 via the direct connection between the communication apparatus 101 and the information processing apparatus 102.

In step S412, the CPU 203 cancels the direct connection between the communication apparatus 101 and the information processing apparatus 102. The CPU 203 then re-establishes the connection between the AP 103 and the information processing apparatus 102 based on the AP information stored in step S405.

In step S413, the CPU 203 executes notification processing for prompting the user to perform the operation for executing the simple connection processing with respect to the AP 103. This process is similar to that in step S317.

In step S414, the CPU 203 starts processing for monitoring whether the AP 103 is executing the simple connection processing. This process is similar to that in step S318.

In step S415, the CPU 203 determines whether the AP 103 is executing the simple connection processing based on the information included in the probe response. This process is similar to that in step S319. If the determination result is "YES" (YES in step S415), the processing proceeds to step S416. If the determination result is "NO" (NO in step S415), the CPU 203 repeatedly executes the processing until a determination of "YES" is made.

In step S416, the CPU 203 executes processing for searching for the communication apparatus 101 for a predetermined period through the Wi-Fi® connection between the AP 103 and the information processing apparatus 102. This process is similar to that in step S320.

In step S417, the CPU 203 determines whether the communication apparatus 101 is found through the searching executed in step S416. This process is similar to that in step S321. If the determination result is "YES" (YES in step S417), the processing proceeds to step S418. If the determination result is "NO" (NO in step S417), the processing proceeds to step S420.

If the determination result is "YES" in step S417, in step S418, the CPU 203 displays the connection success screen 700 indicating success in establishment of the infrastructure connection between the information processing apparatus 102 and the communication apparatus 101 as illustrated in FIG. 7A.

In step S419, the CPU 203 acquires device type information about the communication apparatus 101 from the found communication apparatus 101. The CPU 203 executes processing for installing a printer driver corresponding to the communication apparatus 101 in the information processing apparatus 102 based on the acquired information, and ends the processing.

If the determination result is "NO" in step S417 the processing proceeds to step S420. In step S420, the CPU 203 displays the connection failure screen 710 indicating failure in establishment of the infrastructure connection between the information processing apparatus 102 and the communication apparatus 101 as illustrated in FIG. 7B. This process is similar to that in step S324. The CPU 203 then ends the processing. After the CPU 203 displays the connection failure screen 710, the CPU 203 can execute the network setting processing from step S301 or S401 again.

As described above, in a case where establishment of the infrastructure connection fails even though the instruction to execute the simple connection processing is transmitted through the network setting processing, the CPU 203 retransmits the instruction to execute the simple connection processing through the network resetting processing. This configuration enables the CPU 203 to successfully establish the infrastructure connection through the network resetting processing even if establishment of infrastructure connection fails in the network setting processing.

After the infrastructure connection between the information processing apparatus 102 and the communication apparatus 101 is established through the above-described setting processing, the information processing apparatus 102 can transmit a print job generated by, for example, the printer driver to the communication apparatus 101 through the infrastructure connection.

Figure 5:
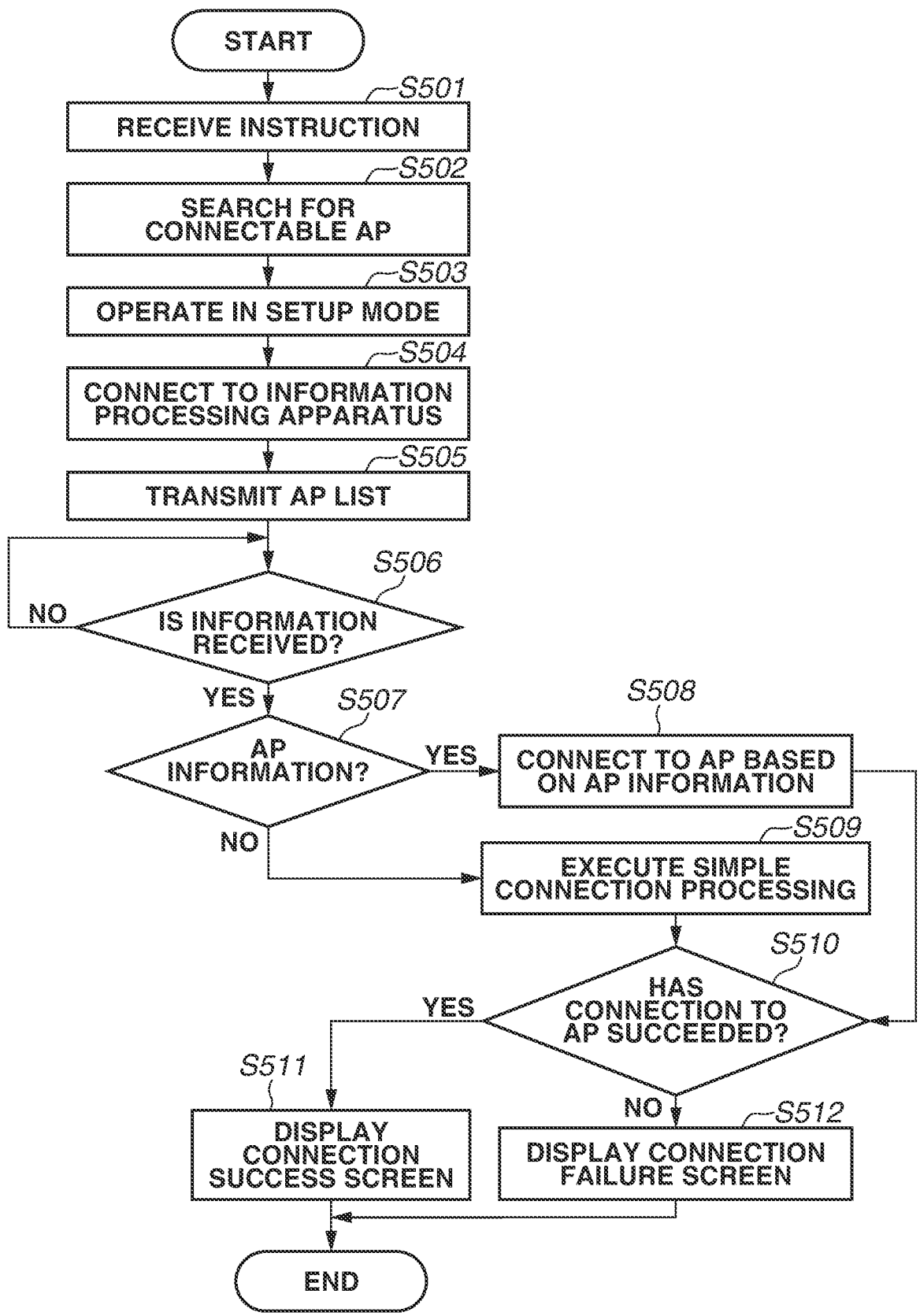
FIG. 5 is a flowchart illustrating network setting processing that is executed by the communication apparatus according to an exemplary embodiment.

FIG. 5 is a flowchart illustrating network setting processing to be executed by the communication apparatus 101. The flowchart illustrated in FIG. 5 is implemented by the CPU 255 reading out a program stored in the ROM 254 to the RAM 253 and executing the program.

Initially, in step S501, the CPU 255 receives a user operation that triggers execution of the network setting processing (i.e., an instruction to execute network setting processing) through an operation unit (not illustrated) included in the communication apparatus 101. Examples of the execution instruction for the network setting processing include performing an operation, for making the communication apparatus 101 operate in the setup mode, on the display unit or with the hard keys of the communication apparatus 101. Examples of the execution instruction for network setting processing is an operation for powering on the communication apparatus 101 after arrival of shipment of the communication apparatus 101.

In step S502, the CPU 255 searches for the AP to which the communication apparatus 101 is connectable through Wi-Fi®. The AP to which the communication apparatus 101 is connectable through Wi-Fi® is an AP using a frequency band usable by the communication apparatus 101 and existing near the communication apparatus 101.

In step S503, the CPU 255 makes the communication apparatus 101 operate in a setup mode. In other words, the CPU 255 makes the communication apparatus 101 operate as a predetermined access point having a predetermined SSID.

In step S504, the CPU 255 receives a connection request from the information processing apparatus 102 and directly connects the communication apparatus 101 to the information processing apparatus 102 through Wi-Fi®.

In step S505, the CPU 255 transmits a list of APs to which the communication apparatus 101 is connectable, which is acquired through the searching executed in step S502, to the information processing apparatus 102 via the direct connection.

In step S506, the CPU 255 determines whether information is received from the information processing apparatus 102 via the direct connection. If the determination result is "YES" (YES in step S506), the processing proceeds to step S507. If the determination result is "NO" (NO in step S506), the CPU 255 repeatedly executes the processing in step S506 until the information is received.

In step S507, the CPU 255 determines whether the information received from the information processing apparatus 102 is the AP information. If the information received from the information processing apparatus 102 is not the AP information, the received information is the instruction to execute the simple connection processing. If the determination result is "YES" (YES in step S507), the processing proceeds to step S508. If the determination result is "NO" (NO in step S507), the processing proceeds to step S509.

If the determination result is "YES" in step S507, in step S508, the CPU 255 initially cancels the setup mode, and cancels the direct connection between the communication apparatus 101 and the information processing apparatus 102. The CPU 255 connects the communication apparatus 101 to the AP corresponding to the AP information through Wi-Fi®, based on the AP information received from the information processing apparatus 102.

If the determination result is "NO" in step S507, in step S509, the CPU 255 initially cancels the setup mode, and cancels the direct connection between the communication apparatus 101 and the information processing apparatus 102. The CPU 255 executes the simple connection processing based on the instruction to execute the simple connection processing received from the information processing apparatus 102. Specifically the CPU 255 searches for a predetermined beacon issued by the AP that is currently executing the simple connection processing, and executes connection setting with the AP that issues the predetermined beacon, thus connecting the communication apparatus 101 to that AP through Wi-Fi®. At this time, the CPU 255 can perform a notification processing, that is, displaying a screen that notifies the user that an operation for executing the simple connection processing is to be performed on the AP.

In step S510, the CPU 255 determines whether a connection between the AP and the communication apparatus 101 is established successfully. If the determination result is "YES" (YES in step S510), the processing proceeds to step S511. If the determination result is "NO" (NO in step S510), the processing proceeds to step S512.

If the determination result is "YES" in step S510, in step S511, the CPU 255 displays a screen indicating success in establishment of the connection between the AP and the communication apparatus 101.

If the determination result is "NO" in step S510, in step S512, the CPU 255 displays a screen indicating failure in establishment of the connection between the AP and the communication apparatus 101.

As described above, in the present exemplary embodiment, if the communication apparatus 101 is not connectable to the AP based on the AP information transmitted by the information processing apparatus 102, the information processing apparatus 102 checks whether the communication apparatus 101 and the AP support the simple connection processing. If the information processing apparatus 102 ascertains that the communication apparatus 101 and the AP support the simple connection processing, the information processing apparatus 102 transmits the instruction to execute the simple connection processing to the communication apparatus 101. This configuration enables a connection between the communication apparatus 101 and the AP to be simply and reliably established. This configuration also enables the communication apparatus 101 to start the simple connection processing without a direct operation of the user, thus improving the convenience of the user.

If the communication apparatus 101 is not connectable to the AP based on the information transmitted by the information processing apparatus 102, the information processing apparatus 102 executes notification processing for prompting the user to perform an operation for executing the simple connection processing on the AP. This configuration enables the user to recognize the operation to be performed when the simple connection processing is to be executed between the communication apparatus 101 and the AP. Thus, the convenience to the user is improved.

Other Exemplary Embodiments

In above-described exemplary embodiments, Wi-Fi® is described to be used as a communication method for both transmitting AP information and an execution instruction and a communication method used for establishing the infrastructure connection. The communication method is not limited to the above-described embodiment. For example, the communication method used for transmitting AP information and an execution instruction can be different from the communication method used for establishing the infrastructure connection. Specifically, for example, Bluetooth® Classic or Bluetooth® Low Energy can be used as the communication method used for transmitting AP information and an execution instruction, and Wi-Fi® can be used as the communication method used for establishing the infrastructure connection. If the communication method used for transmitting AP information and an execution instruction is different from the communication method used for establishing the infrastructure connection, the information processing apparatus 102 does not have to be disconnected from the AP before the AP information is transmitted. In other words, in step S307, the information processing apparatus 102 can transmit the AP information about the currently-connected AP to the communication apparatus 101. In a case where the communication method used for transmitting the AP information and the execution instruction is different from the communication method used for establishing the infrastructure connection, the information processing apparatus 102 does not have to terminate the connection with respect to the communication apparatus 101 established through the communication method used for transmitting the AP information and the execution instruction after the transmission is executed. After transmitting the AP information and the execution instruction, the information processing apparatus 102 can receive information indicating success or failure in establishment of the connection with respect to the AP based on the AP information and the execution instruction and display the received information.

In the above-described exemplary embodiments, the information processing apparatus 102 transmits the AP information to the communication apparatus 101 in step S307 or S312, but this is not seen to be limiting. In step S307 or S312, the information processing apparatus 102 can transmit the instruction to execute the simple connection processing. The information processing apparatus 102 can determine whether the AP and the communication apparatus 101 support the simple connection processing before transmitting the instruction to execute the simple connection processing. The information processing apparatus 102 can execute notification processing for prompting the user to perform an operation for executing the simple connection processing after transmission of the instruction to execute the simple connection processing.

In above-described exemplary embodiments, the information processing apparatus 102 executes the notification processing for prompting the user to perform an operation for executing the simple connection processing after transmission of the instruction to execute the simple connection processing in step S315. However, this is not limited thereto. For example, the information processing apparatus 102 can transmit the instruction to execute the simple connection processing to the communication apparatus 101 as well as to the AP to be caused to execute the simple connection processing. This configuration excludes the need for the user to directly operate both of the AP and the communication apparatus 101 in executing the simple connection processing The processing for determining whether the AP supports the simple connection processing may be executed by the communication apparatus 101. The communication apparatus 101 then transmits a determination result to the information processing apparatus 102, and the information processing apparatus 102 executes the processing based on the received determination result.

In above-described exemplary embodiments, notification processing is executed in order to establish a connection between the communication apparatus 101 and an access point. The above-described exemplary embodiments are not seen to be limiting. For example, the notification processing can be executed in order to establish a connection between the information processing apparatus 102 and an access point. In such a case, the information processing apparatus 102 itself executes the simple connection processing instead of causing the communication apparatus 101 to execute the simple connection processing.

An aspect of the present disclosure can be attained by the following configuration. The configuration supplies a storage medium storing a program of software that implements the functions of the above-described exemplary embodiment to a system or apparatus, and causes a computer (including a CPU or a micro processing unit (MPU)) of the system or apparatus to read out and execute the program stored in the storage medium. In this case, the program itself read out from the storage medium implements the functions of the above-described exemplary embodiment, and the storage medium storing the program configures the present invention.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-219685, filed Nov. 22, 2018, which is hereby incorporated by reference herein in its entirety.

What is claimed is:

1. A control method for an information processing apparatus, the control method comprising:
    determining, based on processing performed by the information processing apparatus, before connection processing is executed by a predetermined access point, whether the connection processing is executable by the predetermined access point, the connection processing being based on a predetermined standard that is AirStation™ One-Touch Secure System (AOSS) or Wi-Fi Protected Setup™ (WPS); and
    executing notification processing for prompting a user to perform a predetermined user operation on the predetermined access point, the predetermined user operation being an operation for causing the predetermined access point to execute the connection processing, the executing of the notification processing being based on a determination that the connection processing is executable by the predetermined access point.

2. The control method according to claim 1, wherein a connection between the predetermined access point and a communication apparatus, the connection apparatus being different from the information processing apparatus and the predetermined access point, is established through the connection processing executed based on the predetermined user operation.

3. The control method according to claim 2, further comprising determining whether the connection processing is executable by the communication apparatus,
    wherein the notification processing is executed in a case where it is determined that the connection processing is executable by the predetermined access point and it is determined that the connection processing is executable by the communication apparatus.

4. The control method according to claim 3, further comprising receiving information indicating whether the connection processing is executable by the communication apparatus from the communication apparatus via a connection between the information processing apparatus and the communication apparatus,
    wherein, based on the received information indicating whether the connection processing is executable by the communication apparatus, it is determined whether the connection processing is executable by the communication apparatus.

5. The control method according to claim 2, further comprising receiving a predetermined instruction to execute connection setting of the communication apparatus from a user,
    wherein the notification processing is executed in a case where the communication apparatus and an access point to which the information processing apparatus is connected, at least when the predetermined instruction is received, are not connectable and it is determined that the connection processing is executable by the predetermined access point.

6. The control method according to claim 5, further comprising acquiring a list of at least one access point to which the communication apparatus is connectable from the communication apparatus,
wherein, in a case where the access point to which the information processing apparatus is connected at least when the predetermined instruction is received is not included in the list, the communication apparatus and the access point to which the information processing apparatus is connected at least when the predetermined instruction is received are not connectable, and
wherein, in a case where the access point to which the information processing apparatus is connected at least when the predetermined instruction is received is included in the list, the communication apparatus and the access point to which the information processing apparatus is connected at least when the predetermined instruction is received are connectable.

7. The control method according to claim 6, further comprising transmitting, to the communication apparatus, the connection information for connecting to the access point to which the information processing apparatus is connected at least when the predetermined instruction is received, via a connection between the information processing apparatus and the communication apparatus, in a case where the communication apparatus and the access point to which the information processing apparatus is connected at least when the predetermined instruction is received are connectable, and
wherein the communication apparatus and the access point to which the information processing apparatus is connected at least when the predetermined instruction is received are connected, based on the connection information for connecting to the access point to which the information processing apparatus is connected at least when the predetermined instruction is received.

8. The control method according to claim 2, further comprising transmitting, as an instruction transmission, an instruction to execute the connection processing to the communication apparatus via a connection between the information processing apparatus and the communication apparatus in a case where it is determined that the connection processing is executable by the predetermined access point,
wherein, based on the transmitting of the instruction to execute the connection processing to the communication apparatus, the communication apparatus executes the connection processing for connection to the predetermined access point.

9. The control method according to claim 2, wherein the connection processing that is executed by the communication apparatus includes processing for searching for a beacon issued by the predetermined access point that is executing the connection processing and processing for acquiring the connection information from the predetermined access point that issued the beacon found via the searching.

10. The control method according to claim 2, wherein a connection between the information processing apparatus and the communication apparatus is a connection through Wi-Fi®.

11. The control method according to claim 2, wherein a connection between the information processing apparatus and the communication apparatus is a connection through Bluetooth® Classic or Bluetooth® Low Energy.

12. The control method according to claim 2, wherein a connection between the predetermined access point and the communication apparatus and a connection between the predetermined access point and the information processing apparatus are each a connection through Wi-Fi®.

13. The control method according to claim 2, wherein the communication apparatus includes a printer that executes printing.

14. The control method according to claim 2, wherein a print job is transmitted to the communication apparatus via the predetermined access point after the connection processing is executed.

15. The control method according to claim 2, wherein the predetermined access point includes an access point selected by a user from a list of at least one access point to which the communication apparatus is connectable.

16. The control method according to claim 2, further comprising:
receiving an input of the connection information from a user; and
determining whether the information processing apparatus is connectable to the predetermined access point based on the input connection information,
wherein the notification processing is executed in a case where it is determined that the information processing apparatus is not connectable to the predetermined access point based on the input connection information and it is determined that the connection processing is executable by the predetermined access point,
wherein the input connection information is transmitted to the communication apparatus via a connection between the information processing apparatus and the communication apparatus in a case where it is determined that the information processing apparatus is connectable to the predetermined access point based on the input connection information, and
wherein the communication apparatus is connected to the predetermined access point based on the input connection information in a case where the input connection information is received by the communication apparatus.

17. The control method according to claim 1, wherein the notification processing includes processing for displaying a notification screen for prompting the user to perform the predetermined user operation on the predetermined access point.

18. The control method according to claim 1, wherein the determination as to whether the connection processing is executable by the predetermined access point or not is made based on information received by the information processing apparatus from the predetermined access point.

19. An information processing apparatus comprising:
a determination unit configured to determine, based on processing performed by the information processing apparatus, before connection processing is executed by a predetermined access point, whether the connection processing is executable by the predetermined access point, the connection processing being based on a predetermined standard that is AirStation™ One-Touch Secure System (AOSS) or Wi-Fi Protected Setup™ (WPS); and
a notification unit configured to execute notification processing for prompting a user to perform a predetermined user operation on the predetermined access point, the predetermined user operation being an operation for causing the predetermined access point to execute the connection processing, the executing of the notification processing being based on a determination that the connection processing is executable by the predetermined access point.

20. A non-transitory computer readable storage medium storing instructions for causing a computer to perform a process for controlling an information processing apparatus, the process comprising determining, based on processing performed by the information processing apparatus, before connection processing is executed by a predetermined access point, whether the connection processing is executable by the predetermined access point, the connection processing being based on a predetermined standard that is AirStation™ One-Touch Secure System (AOSS) or Wi-Fi Protected Setup™ (WPS); and executing notification processing for prompting a user to perform a predetermined user operation on the predetermined access point, the predetermined user operation being an operation for causing the predetermined access point to execute the connection processing, the executing of the notification processing being based on a determination that the connection processing is executable by the predetermined access point.

* * * * *